United States Patent
Yap (10) Patent No.: US 10,187,548 B2
(45) Date of Patent: Jan. 22, 2019

(54) STREAK COMPENSATION

(71) Applicant: Hewlett-Packard Development Company, L.P., Houston, TX (US)

(72) Inventor: Choon Hwee Yap, Singapore (SG)

(73) Assignee: Hewlett-Packard Development Company, L.P., Houston, TX (US)

( * ) Notice: Subject to any disclaimer, the term of this patent is extended or adjusted under 35 U.S.C. 154(b) by 93 days.

(21) Appl. No.: 15/327,155

(22) PCT Filed: Jul. 21, 2014

(86) PCT No.: PCT/US2014/047368
§ 371 (c)(1),
(2) Date: Jan. 18, 2017

(87) PCT Pub. No.: WO2016/014015
PCT Pub. Date: Jan. 28, 2016

(65) Prior Publication Data
US 2017/0155798 A1    Jun. 1, 2017

(51) Int. Cl.
| | | |
|---|---|---|
| *G06F 15/00* | (2006.01) | |
| *H04N 1/409* | (2006.01) | |
| *H04N 1/047* | (2006.01) | |
| *H04N 1/00* | (2006.01) | |
| *H04N 1/028* | (2006.01) | |
| *H04N 1/401* | (2006.01) | |

(52) U.S. Cl.
CPC ....... *H04N 1/4097* (2013.01); *H04N 1/00819* (2013.01); *H04N 1/0281* (2013.01); *H04N 1/0473* (2013.01); *H04N 1/401* (2013.01); *H04N 2201/0081* (2013.01); *H04N 2201/044* (2013.01)

(58) Field of Classification Search
CPC ............ H04N 1/4097; H04N 1/00819; H04N 1/0281; H04N 1/401
USPC ....................................................... 358/504
See application file for complete search history.

(56) References Cited

U.S. PATENT DOCUMENTS

| | | |
|---|---|---|
| 6,304,826 B1 | 10/2001 | Liu |
| 7,186,982 B1 | 3/2007 | Kiser |
| 7,423,789 B2 | 9/2008 | Borders et al. |
| 7,453,587 B2 | 11/2008 | Gardner et al. |
| 7,643,678 B2 | 1/2010 | Mizes |

(Continued)

FOREIGN PATENT DOCUMENTS

| | | |
|---|---|---|
| JP | 2002190926 A | 7/2002 |
| JP | 2012204990 A | 10/2012 |

OTHER PUBLICATIONS

HP Web Page ~Vertical Bands, Lines, or Streaks in Copies, Faxes, or Scans, Dec. 7, 2013, 10 pages ~ http://h10025.www1.hp.com/.

*Primary Examiner* — Mark R Milia
(74) *Attorney, Agent, or Firm* — HP Inc. Patent Department (57) ABSTRACT

Example implementations relate to streak compensation. Some examples may calibrate an initial gain for data from an optical element based on a scan of a first calibration target, obtain an image of a second calibration target from the optical element using the calibrated initial gain, and detect at least one streak in the image of the second calibration target. Some examples may also record data representing the at least one detected streak and may calibrate a final gain for the optical element based on the initial gain and the data representing the at least one detected streak.

13 Claims, 8 Drawing Sheets

(56) References Cited

U.S. PATENT DOCUMENTS

| | | |
|---|---|---|
| 8,559,065 B2 | 10/2013 | Deamer |
| 2002/0158192 A1* | 10/2002 | Gann .................... G01N 21/94 |
| | | 250/234 |
| 2004/0169900 A1* | 9/2004 | Chase ................ H04N 1/40056 |
| | | 358/504 |
| 2011/0026085 A1 | 2/2011 | Tsukahara et al. |
| 2014/0177016 A1 | 6/2014 | Wilsher |

* cited by examiner

STREAK COMPENSATION

BACKGROUND

Scanning devices may convert an image (e.g., text, photographs, etc.) printed on a scanning medium (e.g., paper, transparencies, textiles, etc.) into an electronic image suitable for storage, transmission, processing, and/or printing. In a typical image scanner, light reflected from a printed image is focused through an optics system onto arrays of photosensitive devices. The optics system may focus the light to scan one line of the image ("the scanline") at a time to measure the intensity of at least three bands of wavelengths of visible light (e.g., bands of red, green, and blue). The entire image may be scanned by providing relative movement between the photosensitive devices and the original image.

BRIEF DESCRIPTION OF THE DRAWINGS

The following detailed description references the drawings, wherein.

DETAILED DESCRIPTION

The following detailed description refers to the accompanying drawings. Wherever possible, the same reference numbers are used in the drawings and the following description to refer to the same or similar parts. While several examples are described in this document, modifications, adaptations, and other implementations are possible. Accordingly, the following detailed description does not limit the disclosed examples. Instead, the proper scope of the disclosed examples may be defined by the appended claims.

As detailed above, an image may be scanned by focusing light reflected from the image through an optics system. In some instances, however, the resulting scanned electronic image may be degraded by the presence of artifacts and/or defects on various scanner components, such as dust, fibers, blemishes, fingerprints, and the like. For example, even though a scanner may be assembled in a clean-room environment using disciplined clean-room practices, particles from the production environment (e.g., cotton fibers, paper dust, human hairs, etc.) may still end up on or near the scanner optics. These particles may result in undesirable streaking in the scanned electronic image and/or a printout of the scanned image.

Traditional methods may attempt to compensate for these artifacts by performing Photo-Response Non-Uniformity (PRNU) compensation using a white calibration target. However, this traditional method may not compensate for streaks caused by contamination on the scanner lens. For example, when PRNU compensation is performed using a white calibration target, the light reflected from the surface of the white calibration target may be much stronger than the light reflected from the contaminants. Signals generated by the weaker light reflected from the contaminants may not be appropriately measurable. Accordingly, to help achieve optimal scan quality, a scanning device should compensate for streaks in an image caused by artifacts, defects, and the like caused by contamination on the scanner lens.

Examples disclosed herein may provide streak compensation. To this end, example implementations disclosed herein may provide streak compensation by generating a first calibration target data set based on a scan of a first calibration target and generating a second calibration target data set based on a scan of a second calibration target. In some examples, the scan of the second calibration target may be performed by a scanning device calibrated based on the first calibration target data set, and may represent streaks detected in an image of the second calibration target generated during the second calibration target scan. Additionally, some example implementations may compensate for streaks by recalibrating the scanning device using the first calibration target data set and the second calibration target data set.

Figure 1:
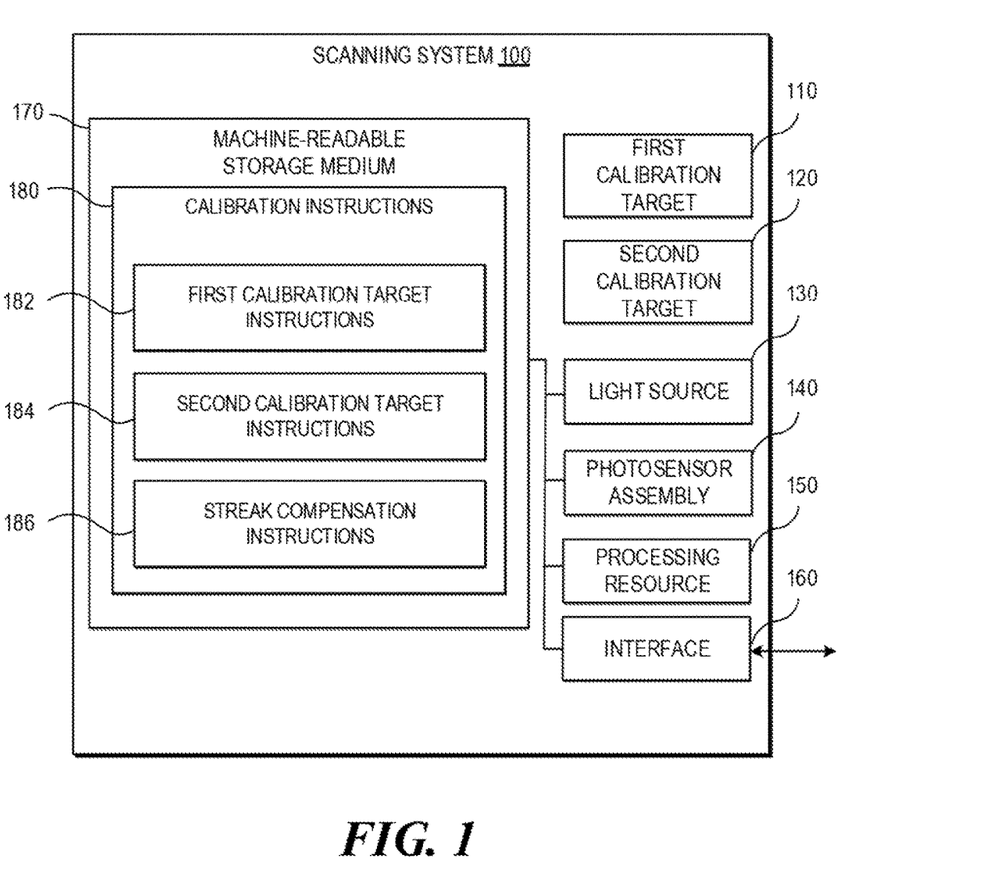
FIG. 1 is a block diagram of an example scanning system consistent with disclosed implementations.

Referring now to the drawings, FIG. 1 is a block diagram of an example scanning system 100 consistent with disclosed implementations. Scanning system 100 may be implemented in various ways. For example, scanning system 100 may be a scanning device (e.g., a contact image sensor scanner), a printer, a computing system, and/or any other type of system or device that can convert an image printed on a scanning medium into an electronic image. In the example shown in FIG. 1 scanning system 100 may include a first calibration target 110, a second calibration target 120, a light source 130, a photosensor assembly 140, a processing resource 150, an interface 160, and a machine-readable storage medium 170.

First calibration target 110 may be any type of target suitable to calibrate a scanning device. For example, first calibration target 110 may be a target suitable for compensating for variation in individual photosensor sensitivity and for variation in light intensity along the length of the scanline. In some implementations, first calibration target 110 may be a fixed-position target provided along a scanline dimension of the scanning device, may be any suitable size, shape, or color, may be provided at any suitable location, and may be formed of any suitable material. For example, first calibration target 110 may be a white and/or light colored strip (e.g. a plastic strip) embedded underneath a scanning device platen. As another example, first calibration target 110 may be a white and/or light-colored piece of paper placed on, near, or under the scanning device platen. While FIG. 1 shows first calibration target 110 as part of system 100, first calibration target 110 may be external to system 100.

Second calibration target 120 may be any type of target suitable to calibrate a scanning device. For example, second calibration target 120, like first calibration target 110, may be a target suitable for compensating for variation in individual photosensor sensitivity and for variation in light intensity along the length of the scanline. In some implementations, second calibration target 120 may be a fixed-position target provided along a scanline dimension of the scanning device, may be any suitable size, shape, or color, may be provided at any suitable location, and may be formed of any suitable material. For example, second calibration target 120 may be a gray, black, and/or dark colored strip embedded underneath the platen of the scanning device. As another example, second calibration target 120 may be a gray, black, and/or dark colored piece of paper placed on, near, or under the print platen. In some implementations, second calibration target 120 and first calibration target 110 may have different sizes, shapes, and colors, may be made of different materials, and may be placed at different locations. For example, the first calibration target 110 may have a lighter color than the second calibration target 120, the second calibration target 120 may have a lighter color than the first calibration target 110, and the like. As another example, first calibration target 110 and second calibration target 120 may be formed together. While FIG. 1 shows second calibration target 120 as part of system 100, second calibration target 120 may be external to system 100.

Light source 130 may be any light source that illuminates a printed image. For example, light source 130 may be a light emitting diode (LED), cold cathode fluorescent lamp (CCFL), and/or any other suitable type of light source. In some implementations, light source 130 may be capable of producing varying light so that a scanning device may capture at least one image of first calibration target 110 and/or second calibration target 120. Light source 130 may be a stand-alone component or collection of components, and may function to illuminate first calibration target 110 and/or second calibration target 120 such that light scattered from targets 110 and/or 120 can be focused onto photosensor assembly 140.

Photosensor assembly 140 may be any sensor assembly capable of sensing light and/or other electromagnetic energy. In some implementations, photosensor assembly 140 may include at least one line-array of photosensors. For example, photosensor assembly may include an array of 12 to 15 sensors (e.g., charge-coupled device (CCD) sensors, complementary metal-oxide semiconductor (CMOS) sensors, CCDMOS sensors, and/or the like) that cover an entire page width of the printed image. In some examples, light scattered from scanlines on a surface of a printed image may be focused through an optical system (e.g. a rod lens) (not shown in FIG. 1) onto photosensor assembly 140. Photosensor assembly 140 may collect a charge from the light and convert the charge into at least one pixel value.

Processing resource 150 may be at least one processing unit (CPU), microprocessing resource, and/or another hardware device to execute instructions to perform operations. For example, processing resource 150 may fetch, decode, and execute calibration instructions 180 (e.g., instructions 182, 184, and/or 186) stored in machine-readable storage medium 170 to perform operations related to disclosed examples.

Interface device 160 may be any device that facilitates the transfer of information between scanning system 100 and external components, such as a scanning device, a desktop computer, a laptop computer, a tablet computing device, a mobile phone, a server, and/or any other suitable type of device. In some examples, interface device 160 may include a network interface device that allows scanning system 100 to receive and send data to and from a network. For example, interface device 160 may retrieve and process data related to calculated final gains and offsets from a computing system remote to system 100.

Machine-readable storage medium 170 may be any electronic, magnetic, optical, or other physical storage device that stores executable instructions. Thus, machine-readable storage medium 170 may be, for example, Random Access Memory (RAM), Electrically-Erasable Programmable Read-Only Memory (EEPROM), a storage drive, an optical disc, and the like. In some implementations, machine-readable storage medium 170 may be a non-transitory computer-readable storage medium, where the term "non-transitory" does not encompass transitory propagating signals. Machine-readable storage medium 170 may be encoded with instructions that, when executed by processing resource 150, perform operations consistent with disclosed implementations. For example, machine-readable storage medium 170 may include calibration instructions 180 that, when executed by processing resource 150, perform operations that may compensate for streaks in a scanned image. In the example shown in FIG. 1, machine-readable storage medium 170 may include first calibration target instructions 182, second calibration target instructions 184, and/or streak compensation instructions 186.

First calibration target instructions 182 may function to generate a first calibration target data set. For example, when first calibration target instructions 182 are executed by a processing resource, such as processing resource 150 of system 100, first calibration target instructions 182 may cause processing resource 150 and/or another processing resource to scan a first calibration target, such as first calibration target 110. In some implementations, the first calibration target may be scanned by performing a dark scan of the target at a first illumination level, a gray scan of the first calibration target at a second illumination level brighter than the first illumination level, and a white scan of the first calibration target at a third illumination level brighter than the second illumination level. The first illumination level, the second illumination level, and the third illumination level may be generated, at least in part, by light source 120. For example, to generate the first illumination level, light source 120 may not emit any light, to generate the second illumination level, light source 120 may be set at one quarter of the maximum illumination level, and to generate the third illumination level, light source 120 may be set at the light source's maximum illumination level. Furthermore, in some implementations, each pixel value and each pixel location of images generated during the dark, gray, and white scans may be determined, and appropriate initial gains and offsets may be calculated based on the dark, gray, and/or white scans. In some implementations, these initial gains and offsets may be stored as the first calibration target data set. For example, in some implementations, the first calibration target data set may correspond to Photo-Response Non-Uniformity (PRNU) calibration data. PRNU may be considered to be a measure of the output of each photosensor compared to the expected voltage for a particular calibration target (e.g., the first calibration target) and/or light source (e.g., light source 130).

Second calibration target instructions 184 may function to generate a second calibration target data set. For example, when second calibration target instructions 184 are executed by a processing resource, such as processing resource 150 of scanning system 100, second calibration target instructions 184 may cause processing resource 150 to scan a second calibration target, such as second calibration target 120, using a scanning device calibrated with the first calibration target data set. In some implementations, the second calibration target data set may represent streaks detected in an image of the second calibration target. For example, when second calibration instructions 184 are executed by processing resource 150, second calibration target instructions 184 may cause processing resource 150 to perform dark and/or gray scans of the second calibration target, determine streak positions of streaks in the image(s) obtained during the scan(s), and determine pixel values associated with the detected streaks. Examples of these processes are described in further detail below with respect to, for example, FIGS. 2-5, 7, and 8.

Streak compensation instructions 186 may function to calibrate a scanning device. For example, when streak compensation instructions 186 are executed by a processing resource, such as processing resource 150 of scanning system 100, streak compensation instructions 186 may cause processing resource 150 and/or another processing resource to determine position values and detected streak values in a second calibration target data set, determine pixel values the first calibration target data set corresponding with the determined second calibration target data set position values, and add the determined first calibration target data set pixel values to the determined second calibration target data set detected streak values. Examples of these processes are described in further detail below with respect to, for example, FIGS. 2, 3 and 6-8.

The arrangement illustrated in FIG. 1 is simply an example, and scanning system 100 may be implemented in a number of different configurations. For example, while FIG. 1 shows one first calibration target 110, second calibration target 120, light source 130, photosensor assembly 140, processing resource 150, interface 160, and machine-readable storage medium 170, scanning system 100 may include any number of components 110, 120, 130, 140, 150, 160, and/or 170 as well as other components not depicted in FIG. 1. For example, scanning system 100 may omit any of components 110, 120, 130, 140, 150, 160, and 170, combine any of components 110, 120, 130, 140, 150, 160, and 170, and/or exclude at least one of components 110, 120, 130, 140, 150, 160, and 170 such that the at least one of components are external to system 100. For example, first calibration target 110 and second calibration target 120 may be formed together, such as by printing the targets on the same sheet of paper. As another example, as discussed above, calibration targets 110 and/or 120 may be external to system 100. As yet another example, machine-readable storage medium 170 may be part of a separate system external to scanning system 100. As another example, while FIG. 1 shows that each of components 130, 140, 150, 160, and 170 are communicatively connected, at least one of components, 130, 140, 150, 160, and 170 may or may not be communicatively connected to each other, other components of scanning system 100, or to external components. Similarly, components not shown as being communicatively connected may be communicatively connected in other implementations.

Figure 2:
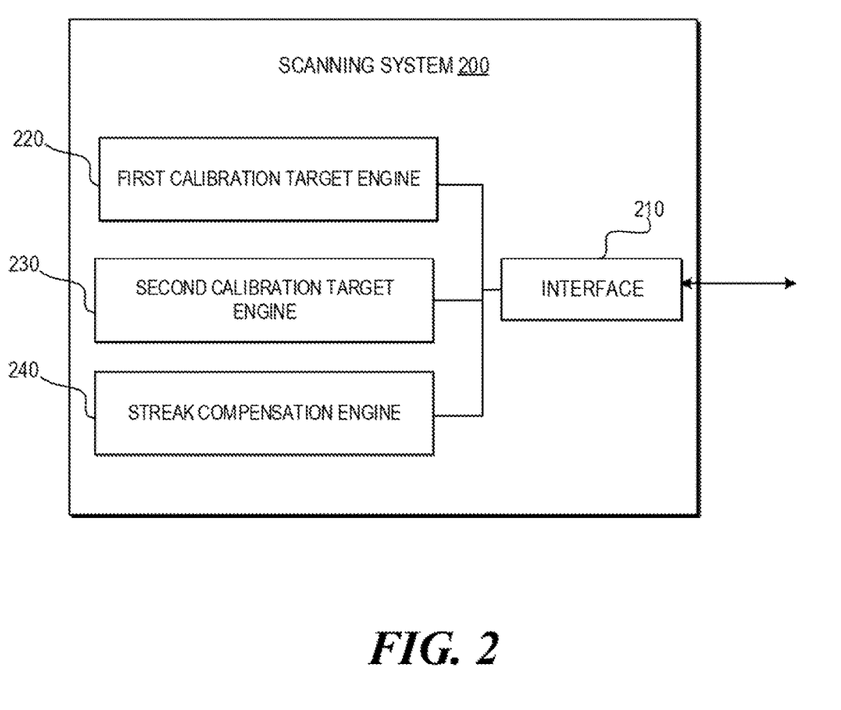
FIG. 2 is a block diagram of an example scanning system consistent with disclosed implementations.

FIG. 2 is a block diagram of an example scanning system 200 consistent with disclosed implementations. In certain aspects, scanning system 200 may correspond to scanning system 100 of FIG. 1. Scanning system 200 may be implemented in various ways. For example, scanning system 200 may include at least one a scanning device, special purpose computer, server, mainframe computer, computing device executing instructions that receive and process information and provide responses, and/or any other component or collection of components. In the example shown in FIG. 2, scanning system 200 may include an interface device 210, a first calibration target engine 220, a second calibration target engine 230, and a streak compensation engine 240.

Interface device 210 may be any device that facilitates the transfer of information between scanning system 200 and external components. In some examples, interface device 210 may include a network interface device that allows scanning system 200 to receive and send data to and from a network. For example, interface device 210 may retrieve and process data related to scanning a printed image from a device external to scanning system 200.

Engines 220, 230, and 240 may be electronic circuitry for implementing functionality consistent with disclosed examples. For example, engines 220, 230, and 240 may represent combinations of hardware devices and programming to implement functionality consistent with disclosed implementations. For example, the programming for the engines may be processor-executable instructions stored on a non-transitory machine-readable storage medium and the hardware for the engines may include a processing resource to execute those instructions. In some examples, the functionality of engines 220, 230, and 240 may correspond to operations performed by scanning system 100 of FIG. 1, such as operations performed when calibration instructions 180 are executed by processing resource 150. In FIG. 2, first calibration target engine 220 may represent a combination of hardware and programming that performs operations similar to those performed when processing resource 150 executes first calibration target instructions 182. Similarly, second calibration target engine 230 may represent a combination of hardware and programming that performs operations similar to those performed when processing resource 150 executes second calibration target instructions 184, and streak compensation engine 240 may represent a combination of hardware and programming that performs operations similar to those performed when processing resource 150 executes streak compensation instructions 186.

Figure 3:
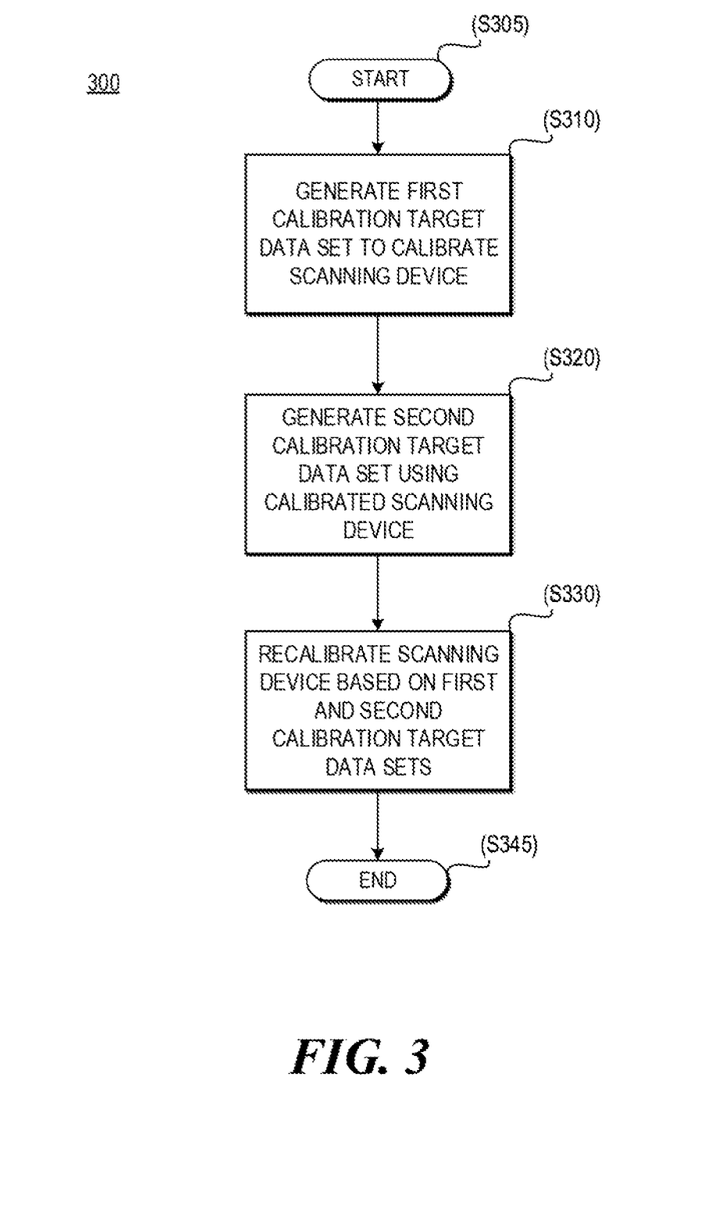
FIG. 3 is a flow chart of an example process for streak compensation consistent with disclosed implementations.

FIG. 3 is a flow chart of air example process 300 for streak compensation consistent with disclosed implementations. Although execution of process 300 is described below with reference to scanning system 100 of FIG. 1 and/or specific components of scanning system 100, other suitable systems and devices for execution of at least one step of process 300 may be used. For example, processes described below as being performed by scanning system 100 may be performed by scanning system 200 and/or any other suitable device or system. Process 300 may be implemented in the form of executable instructions stored on a storage device, such as a machine-readable storage medium, and/or in the form of electronic circuitry.

Process 300 may start (step S305) before a printed image is scanned. For example, process 300 may start when scanning system 100 receives or otherwise accesses instructions to scan a printed image. Once scanning system 100 receives or otherwise accesses the instructions, scanning system 100 may generate a first calibration target data set to calibrate a scanning device (S310).

As discussed above, in some implementations, the first calibration target data set may correspond to PRNU calibration data. Thus, in some implementations, system 100 may compensate, before scanning, for variation in intensity of individual photosensors in photosensor assembly 140 and for variation in light intensity by performing PRNU compensation. For example, light may be scattered from first calibration target 110 onto photosensor assembly 140, and the resulting voltage from each photosensor may be measured. For example, a scanning device may perform a dark scan of first calibration target 110 at a first illumination level, a gray scan of first calibration target 110 at a second illumination level brighter than the first illumination level, and a white scan of first calibration target 110 at a third illumination level brighter than the second illumination level. These scans may generate a plurality of images of the first calibration target at different illumination levels (e.g., a dark first calibration target image, a gray first calibration target image, and a white first calibration target image). In some implementations, system 100 may also analyze data relating to these scans to determine gains and offsets for each photosensor in photosensor array 140. For example, system 100 may determine each pixel value and pixel location of the dark first calibration target image, the gray first calibration target image, and the white first calibration target image to determine appropriate initial gains and offsets. These initial gains and offsets may be used to calibrate the scanning device. For example, the scanning device may be calibrated such that each pixel value of a scanned image of the first calibration target would be at or near a target pixel value. Examples of generating a first calibration target data set are described in greater detail below with respect to, for example, FIGS. 7 and 8.

Process 300 may also include generating a second calibration target data set (step S320). In some implementations, the second calibration target data set may be generated by a scanning device that has been calibrated using the first calibration target data set. For example, the second calibration target data set may be generated by a scanning device that is actively using PRNU compensation. In some implementations, system 100 may scan a second calibration target to generate the second calibration target data set. For example, system 100 may perform a dark scan of the second calibration target, calculate dark column pixel values, calculate a dark narrow window average and a dark wide window average, and/or determine a dark difference value between the dark narrow window average and the dark wide window average. Additionally, in some examples, system 100 may also determine whether the dark difference value exceeds a dark threshold and, if so, may calculate a dark detected streak value. Similarly, in some examples, system 100 may perform a gray scan of the second calibration target, calculate gray column pixel values, calculate a gray narrow window average and a gray wide window average, determine a gray difference value between the gray narrow window average and the gray wide window average, and, if the difference exceeds a gray threshold, calculate a gray detected streak value. Examples of generating a second calibration target data set are discussed in further detail below with respect to, for example, FIGS. 4, 5, 7, and 8.

Process 300 may also include compensating for streaks by recalibrating the scanning device using the first and second calibration target data sets (step S330). In some implementations, system 100 may recalibrate the scanning device using a first portion of the first calibration target data set and a combination of a second portion of the first calibration target data set and the second calibration target data set. For example, for each detected streak in the second calibration target data set, system 100 may determine the position of the streak and the associated detected streak value in the second calibration target data set. System 100 may also determine the pixel values of the first calibration target data set that have the same position as the streaks in the second data set and, for each position, may add these pixels values to the detected streak values. Examples of steps involved with recalibrating the scanning device using the first and second calibration target data sets are discussed in further detail below with respect to, for example, FIGS. 7, 8, and 9.

After the first calibration target data set is generated (step S310), the second calibration target data set is generated (step S320), and the scanning device is recalibrated (step S330), process 300 may end (step S345).

Figure 4:
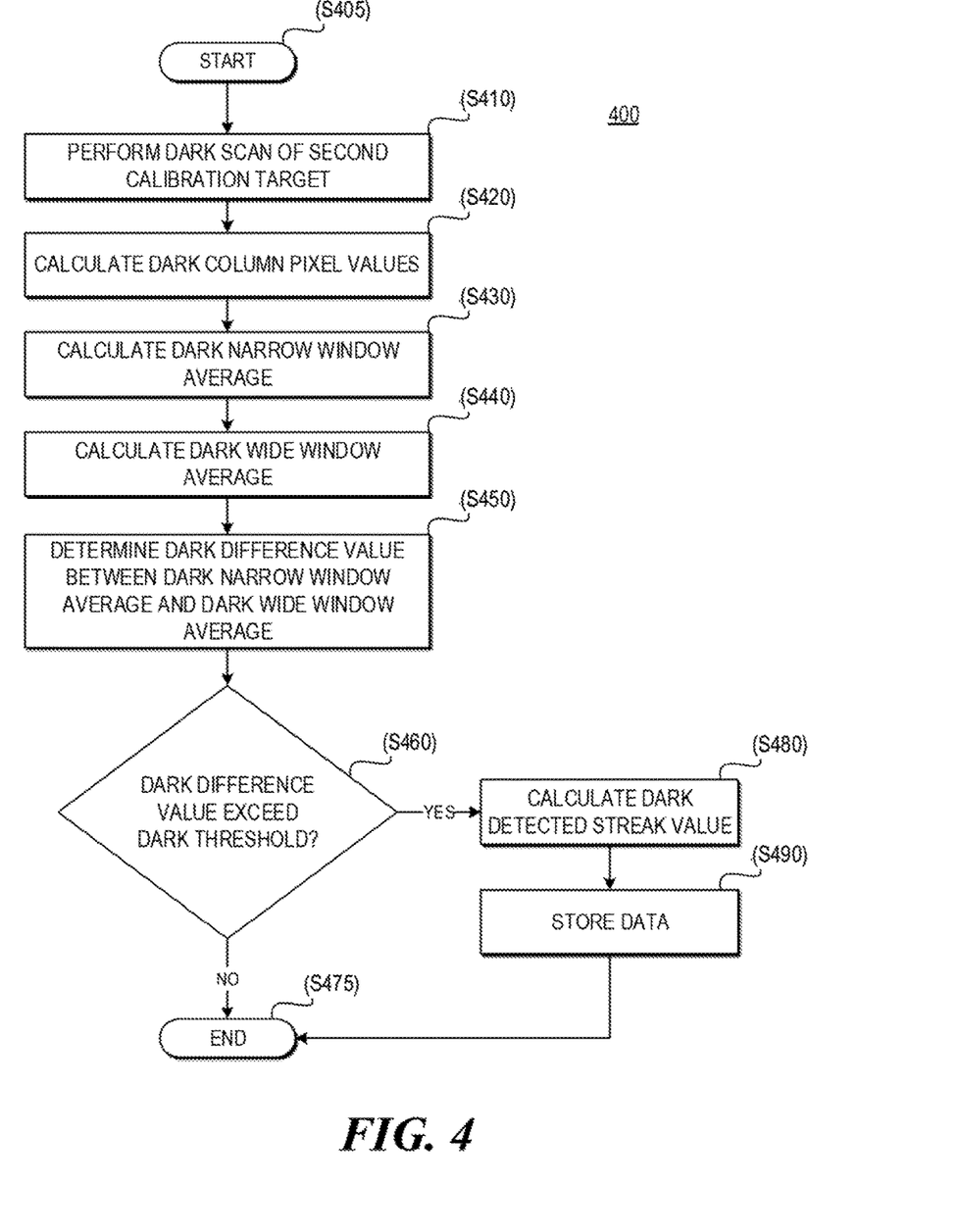
FIG. 4 is a flow chart of an example process for generating a second calibration target data set consistent with disclosed implementations.

FIG. 4 is a flow chart of an example process 400 for generating a second calibration target data set consistent with disclosed implementations. Although execution of process 400 is described below with reference to scanning system 100 of FIG. 1 and/or specific components of scanning system 100, other suitable systems and devices for execution of at least one step of process 400 may be used. For example, processes described below as being performed by scanning system 100 may be performed by scanning system 200 and/or any other suitable device or system. Process 400 may be implemented in the form of executable instructions stored on a storage device, such as a machine-readable storage medium, and/or in the form of electronic circuitry.

Process 400 may begin (step S405) after PRNU compensation has been performed. For example, a scanning device may be calibrated with an initial set of gains and offsets using PRNU compensation data, such as the first calibration target data described above. After the scanning device has been calibrated, the scanning device may perform a scan of a second calibration target (step 410). For example, the scanning device may perform a dark scan of second calibration target 120 at an illumination level to generate an electronic image of the second calibration target (e.g., dark second calibration image). In some examples, the illumination level may be the same as the second illumination level used to scan the first calibration target. In some examples, the first illumination level may correspond with an illumination level when light source 130 is turned on.

Process 400 may also include calculating dark column pixel values for the dark second calibration image (step S420). For example, in some implementations, the dark second calibration target image may include a set of dark pixel columns, where each of the set of dark pixel columns may include a dark column pixel value and a dark column position value. The dark column pixel values may correspond to the average of each pixel value in a particular column of the dark second calibration image. For example, system 100 may scan a particular number of rows and columns of the second calibration target when generating the dark second calibration image (e.g., a 1 mm scan may include 10 rows and 1000 columns). Each pixel in the dark second calibration image may include a plurality of pixel values corresponding to various color channels (e.g., a red pixel value, a green pixel value, and a blue pixel value for RGB). For each pixel in a particular column, at least one color channel value may be added together and divided by the total number of rows in the image to obtain column color channel values (e.g., each red value may be added together and divided by the total number of rows to obtain a red column color channel value, each green value may be added together than divided by the total number of rows to obtain a green column color channel value, etc.). In some examples, various pixel values (e.g., outliers) may be discarded from the column color channel value calculations. The column color channel values may be averaged together to obtain the dark column pixel value. Thus, in some examples, calculating the dark column pixel value may function to flatten the original scan from the particular number of rows to a single row.

Process 400 may also include calculating a dark narrow window average at the column of interest (step S430). In some implementations, process 400 may calculate the dark narrow window average by averaging the dark column pixel values of a narrow window of columns adjacent to the column of interest. For example, process 400 may calculate the dark narrow window average by averaging the dark column pixel values of a first number of the set of dark pixel columns. For example, system 100 may analyze the flattened original scan, starting with the first column (e.g., column 1) and may move a particular number of columns to the right (e.g., 5 columns) to calculate the average of all of the dark column pixel values of those particular columns in the narrow window. Thus, for the first pixel, the dark narrow window average may be an average of the dark column pixel values of columns 1, 2, 3, 4 and 5. System 100 may then move to the next column and calculate the narrow window average for that particular column. For example, for the second pixel, the dark narrow window average may be an average of the dark column pixel values of columns 2, 3, 4, 5, and 6. While in this particular example there are 5 columns included in the narrow window, the narrow window may be any suitable number of columns.

Process 400 may also include calculating a dark wide window average at the column of interest (step S440). In some implementations, process 400 may calculate the dark wide window average by averaging the dark column pixel values of a wide window of columns adjacent to the column of interest. For example, system 100 may calculate a dark wide window average by averaging dark column pixel values of a second number of the set of dark pixel columns, the second number being larger than the first number. For example, system 100 may analyze the flattened original scan, starting with the first column (e.g., column 1) and may move a particular number of columns to the right (e.g., 60 columns) to calculate the average of all of the dark column pixel values of those particular columns in the wide window. Thus, for the first pixel, the dark wide window average may be an average of the dark column pixel values of columns 1 through 60, and for the second pixel, the dark wide window average may be an average of the dark column pixel values of columns 2 through 61. While in this particular example there are 60 columns included in the wide window, the wide window may include any suitable number of columns. For example, the wide window may have more columns than the narrow window and/or may be sufficiently large enough to span more than 50% of the largest streak.

Process 400 may also include, for each column of interest, determining the difference (e.g., a dark difference value) between the dark narrow window average and the dark wide window average (step S450). In some implementations, if the difference exceeds a threshold, system 100 may calculate a dark detected streak value by obtaining the difference between the dark column pixel value of a particular column and the dark wide window average. For example, the narrow window average for column 1 may be subtracted from the wide window average for column 1, the narrow window average for column 2 may be subtracted from the wide window average for column 2, and the like.

Process 400 may also include determining if the dark difference value exceeds a dark threshold value (step S460). In some implementations, system 100 may determine if the dark difference value exceeds the dark threshold value by comparing the dark difference value to the dark threshold value. If the difference does not exceed the dark threshold value (step S460; no), process 400 may end (step S475). However, if the dark difference value exceeds the dark threshold value (step S460; yes), process 400 may include determining that a streak has been detected and/or calculating a dark detected streak value (step S480). In some examples, system 100 may calculate a dark detected streak value by calculating the difference between the dark column pixel value for the particular column of interest and the dark wide window average. In some examples, process 400 may also include storing the dark detected streak value and the position of the column in a storage device, such as machine-readable storage medium 180 (step S490). In some examples, this data may correspond to the second calibration target data discussed above and thus the data may be stored as a dark image entry in the second calibration target data set. After the data has been stored, process 400 may end (step S475).

Figure 5:
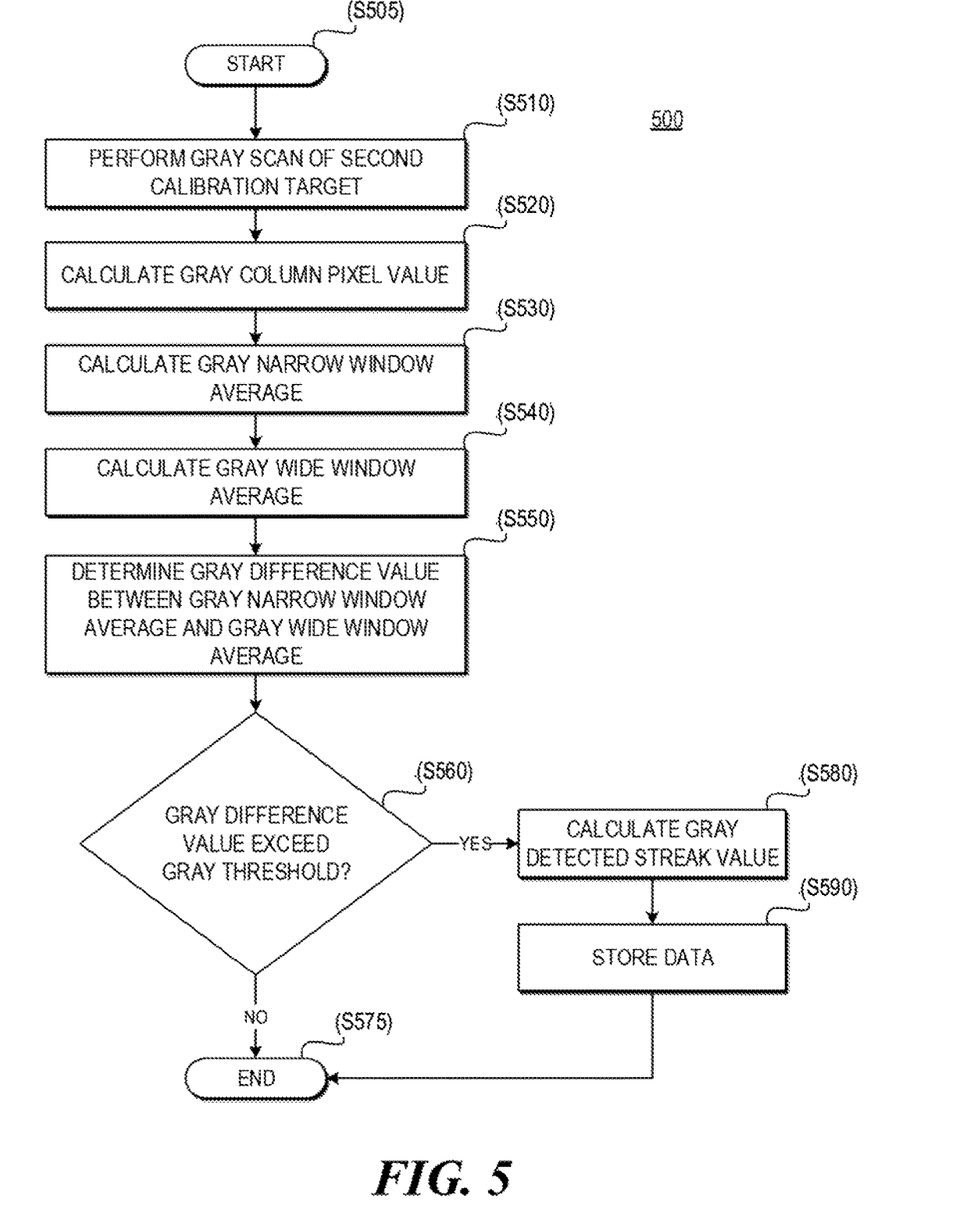
FIG. 5 is a flow chart of an example process for generating a second calibration target data set consistent with disclosed implementations.

FIG. 5 is a flow chart of an example process 500 for generating a second calibration target data set consistent with disclosed implementations. Although execution of process 500 is described below with reference to scanning system 100 of FIG. 1 and/or specific components of scanning system 100, other suitable systems and devices for execution of at least one step of process 500 may be used. For example, processes described below as being performed by scanning system 100 may be performed by scanning system 200 and/or any other suitable device. Process 500 may be implemented in the form of executable instructions stored on a storage device, such as a machine-readable storage medium, and/or in the form of electronic circuitry.

In certain aspects, process 500 may correspond to process 400 of FIG. 4, and may include similar operations to those performed in process 400. In some implementations, process 500 may differ from process 400 in that the second calibration target may be scanned using a different illumination level than the illumination level used in process 400. For example, after process 500 starts (step S505), system 100 may perform a gray scan of the second calibration target 120 at an illumination level (step S510) to generate an electronic image of the second calibration target (e.g., gray second calibration target image) including a set of gray pixel columns, with each of the gray pixel columns including a gray column pixel value and a gray column position value. They gray column pixel value may represent an average value of a column of gray second calibration target image pixels and the gray column position value may indicate a position of a column respective to other columns of the gray second calibration target image.

In some examples, the second illumination level may be brighter than the first illumination level used to scan the second calibration target, the third illumination level used to scan the first calibration target, and/or light source 130 may be used to set the second illumination level. In FIG. 5, step S520 may include operations similar to those performed in step S420 of FIG. 4 (e.g., calculate gray column pixel values using the gray second calibration target image, such as by modifying the set of gray pixel values corresponding to a particular column to remove at least one outlier and/or averaging, for each of a plurality of color channels, the modified set of gray pixel values), step S530 may include operations similar to those performed in step S430 of FIG. 4 (e.g., calculate a gray narrow window average using the gray second calibration target image by averaging gray column pixel values of a first number of the set of gray pixel columns), step S540 may include operations similar to those performed in step S440 of FIG. 4 (calculate gray wide window average using the gray second calibration target image by averaging gray column pixel values of a second number of adjacent columns (e.g., a second number of columns adjacent to the particular column of interest), where the second number of columns is larger than the first number of columns), step S550 may include operations similar to those performed in step S450 of FIG. 4 (determine a difference value (e.g., a gray difference value) between the gray narrow window average and the gray wide window average), step S560 may include operations similar to those performed in step S460 of FIG. 4 (determine if the difference value (e.g., the gray difference value) exceeds a gray threshold), step S575 may include operations similar to those performed in step S475 of FIG. 4 (e.g., end process if the difference value does not exceed the gray threshold), step S580 may include operations similar to those performed in step S480 of FIG. 4 (e.g., calculate a gray detected streak value if the difference value exceeds the gray threshold by obtaining the difference between the gray column pixel value and the gray wide window average), and step S590 may include operations similar to those performed in step S490 of FIG. 4 (e.g., store data related to the gray second calibration target image, such as the gray column position value of the particular column and the gray detected streak value as a gray image entry in the second calibration target data set). The gray threshold may be the same as the dark threshold or may be a different value. After at least one of steps S510 through S590 have been performed, process 500 may end (step S575).

Figure 6:
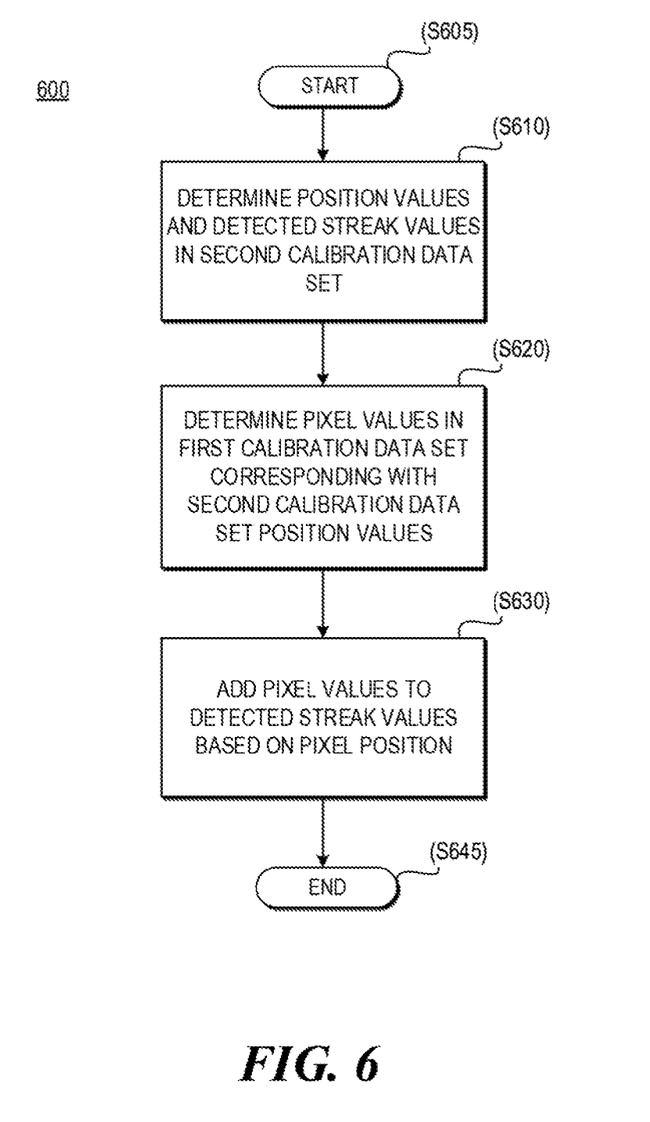
FIG. 6 is a flow chart of an example process for recalibrating a scanning device using first and second calibration target data sets consistent with disclosed implementations.

FIG. 6 is a flow chart of an example process 600 for recalibrating a scanning device using first and second calibration target data sets consistent with disclosed implementations. Although execution of process 600 is described below with reference to scanning system 100 of FIG. 1 and/or specific components of scanning system 100, other suitable systems and devices for execution of at least one step of process 600 may be used. For example, processes described below as being performed by scanning system 100 may be performed by scanning system 200 and/or any other suitable device or system. Process 600 may be implemented in the form of executable instructions stored on a storage device, such as a machine-readable storage medium, and/or in the form of electronic circuitry.

Process 600 may start (step S605) after the first and/or second calibration target data sets are generated. In some examples, process 600 may include determining position values and corresponding detected streak values of the second calibration target data set (step S610). In some implementations, system 100 may determine the position values and the detected streak values by accessing the second calibration target data set. For example, system 100 may retrieve the second calibration target data set from a storage device, such as machine-readable storage medium 170.

Process 600 may also include determining pixel values in the first calibration target data set that correspond with the determined position values in the second calibration target data set (step S620). In some implementations, system 100 may determine pixel values in the first calibration target data set that correspond with the determined position values in the second calibration set by accessing the first calibration target data set (e.g., by retrieving the first calibration target data set from a storage device, such as machine-readable storage medium 170) and comparing the position values in the second calibration target data set to position values in the first calibration target data set. If the position values match, system 100 may determine the pixel value(s) associated with the position match. For each position (and for each scan type), these pixel value(s) in the first calibration target data set may be added to the corresponding detected streak values in the second calibration target data set (step S630). In other words, the dark detected streak values may be added to corresponding dark pixel values to generate a dark scan profile and gray pixel values may be added to gray detected streak values to generate a gray scan profile. For example, if a streak was detected in row 1 column 5 in a dark scan of the second calibration target, the corresponding detected streak value for row 1, column 5 may be added to the dark scan pixel value(s) for row 1, column 5 in the first calibration target data set. Thus, in some examples, the first calibration data set may be modified based on a first portion of the first calibration target data set and a combination of the second calibration target data set and a second portion of the first calibration target data set. This modified first calibration target data set may be used to compensate for the affected pixels by appropriate gains and offsets (e.g., final gains and offsets may be calculated based on the dark scan profile and the gray scan profile). For example, this modified data set may be used to achieve a particular pixel value for each column of pixels. After the pixel values are added to the detected streak values based on pixel position, process 600 may end (step S645).

Figure 7:
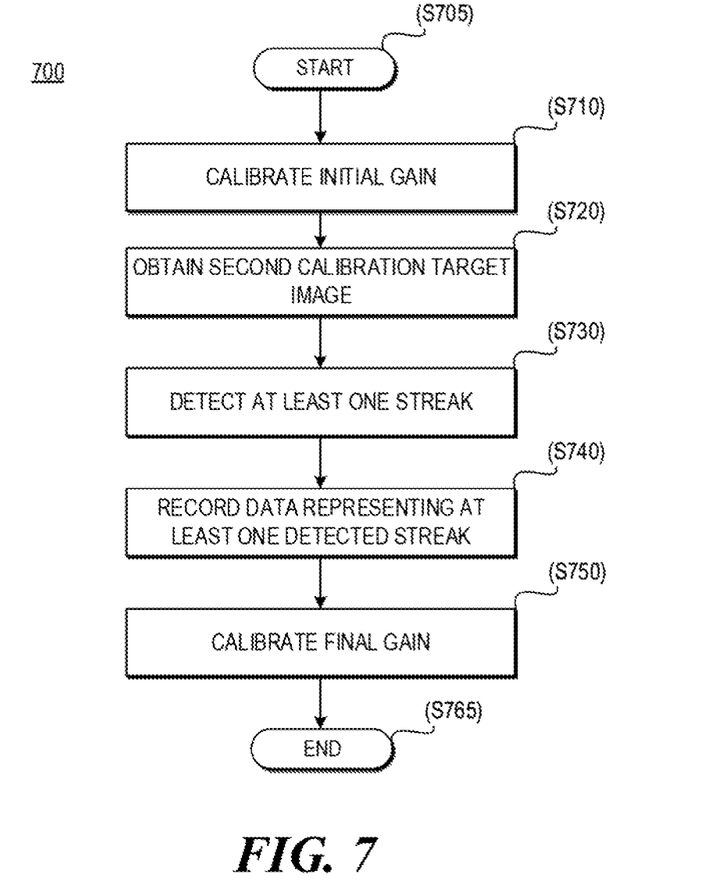
FIG. 7 is a flow chart of an example process for streak compensation consistent with disclosed implementations.

FIG. 7 is a flow chart of an example process 700 for streak compensation consistent with disclosed implementations. Although execution of process 700 is described below with reference to scanning system 100 of FIG. 1 and/or specific components of scanning system 100, other suitable systems and devices for execution of at least one step of process 700 may be used. For example, processes described below as being performed by scanning system 100 may be performed by scanning system 200 and/or any other suitable device or system. Process 700 may be implemented in the form of executable instructions stored on a storage device, such as a machine-readable storage medium, and/or in the form of electronic circuitry.

Process 700 may begin (step S705) after a scanning device has been given instructions to capture a printed image. After the instructions have been received, process 700 may include calibrating an initial gain from an optical element (step S710). In some implementations, the initial gain may be calibrated based on a scan of a first calibration target. In some examples, the scan of the first calibration target may be used to generate first calibration target data. For example, the image generated during the scan of the first calibration target may be analyzed to generate PRNU calibration data. For example, system 100 may calibrate the initial gain by generating a first calibration target data set using a dark scan of a first calibration target, a gray scan of the first calibration target, and/or a white scan of the first calibration target, as discussed above with respect to, for example, FIGS. 1-3.

Process 700 may also include obtaining a second calibration target image (step S720). For example, process 700 may include obtaining a second calibration target image from an optical element (e.g., photosensor assembly 140) using the calibrated initial gain. For example, the second calibration target image may be obtained after the scanning device including the optical element has been calibrated using PRNU compensation. In some implementations, the second calibration target image may include a plurality of images of a second calibration target captured under varying lighting conditions. For example, images of the second calibration target may be captured using a dark scan and/or a gray scan, as discussed above with respect to, for example, FIGS. 1-5.

Process 700 may also include detecting at least one streak based on the scan of the second calibration target (step S730). For example, process 700 may include detecting reflected light from particles on the optical element using the second calibration target. The reflected light from the particles may be detected by detecting streaks in the image(s) generated during the scan of the second calibration target. For example, in some implementations, system 100 may detect at least one streak in the image by determining the position of the streaks (e.g., a first streak) in the image of the second calibration target and determining a reflection strength associated with the streaks (e.g., a reflection strength associated with the first streak). Furthermore, in some implementations, process 700 may detect at least one streak in the image by determining whether difference values between narrow window averages and wide window averages in each image exceed at least one threshold. Thus, in some implementations, process 700 may detect at least one streak in the image(s) using the processes described above with respect to, for example, FIGS. 1-5. Additionally, in some implementations, data representing the detected streak may be recorded and/or otherwise stored in a storage device (step S740). For example, the detected streak position and any corresponding pixel value(s) may be stored in a storage device, such as machine-readable storage medium 170 (step S740).

Process 700 may also include calibrating a final gain for the optical element based on the initial gain and the data representing the at least one detected streak (step S750). For example, system 100 may calibrate the final gain by determining, using the first calibration target data, a pixel value associated with the position of each detected streak (e.g. the position of the first streak), modifying the first calibration target data by adding the reflection strength to the pixel value, and using the modified first calibration target data to modify image data from the optical element. In some implementations, the calibrated final gain for the optical element may be performed based on the processes described above with respect to, for example, FIGS. 1-3 and 6. After the final gain is calibrated (step S750), process 700 may end (step S765)

Figure 8:
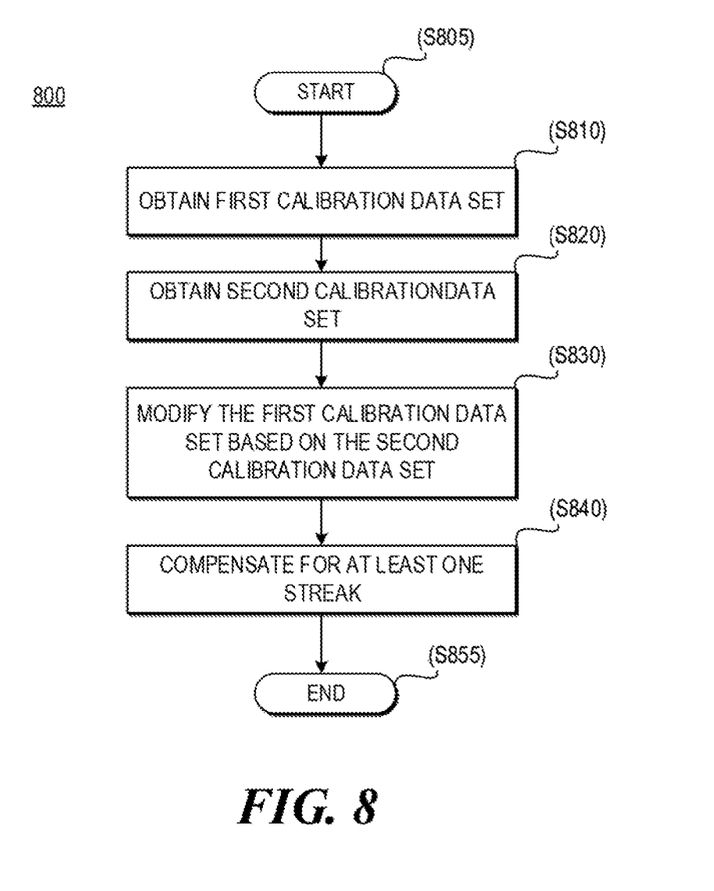
FIG. 8 is a flow chart of an example process for streak compensation consistent with disclosed implementations.

FIG. 8 is a flow chart of an example process 800 for streak compensation consistent with disclosed implementations. Although execution of process 800 is described below with reference to scanning system 100 of FIG. 1 and/or specific components of scanning system 100, other suitable systems and devices for execution of at least one step of process 800 may be used. For example, processes described below as being performed by scanning system 100 may be performed by scanning system 200 and/or any other suitable device or system. Process 800 may be implemented in the form of executable instructions stored on a storage device, such as a machine-readable storage medium, and/or in the form of electronic circuitry.

Process 800 may begin (step S805) after instructions to scan a printed image have been received. Process 800 may include obtaining a first calibration target data set using a first calibration target (step S810). For example, in some implementations, system 100 may include instructions which, when executed by a processing resource (e.g., processing resource 150), obtain a first calibration target data set using a processing resource. For example, system 100 may scan a first calibration target to obtain the first calibration target data set and/or may receive or otherwise access information relating to a scan of a first calibration target to obtain a first calibration target data set. The first calibration target data set may correspond to the first calibration target data set described above with respect to, for example, FIGS. 1-7.

Process 800 may also include obtaining a second calibration set using a second calibration target (step S820). For example, the second calibration target data set may be obtained by system 100 (e.g., a scanning device that constitutes part of or the entirety of system 100) after the scanning device is initially calibrated using the first calibration target data set. In some implementations, the second calibration target data set may indicate at least one streak in an image of the second calibration target. For example, the second calibration target data set may correspond to the second calibration target data set described above with respect to, for example, FIGS. 1-7.

Process 800 may also include modifying the first calibration target data set based on the second calibration target data set (step S830). For example, detected streak values in the second calibration target data set may be added to pixel values in the first calibration target data set. In some implementations, the detected streak values in the second calibration target data set may be added to pixel values in the first calibration target data set based on pixel location. For example, system 100 may add, based on pixel location, pixel values in the second calibration target data set to pixel values in the first calibration target data set. Examples of modifying the first calibration target data set based on the second calibration target data set are discussed above with respect to, for example, FIGS. 1-7.

Process 800 may include compensating, via the processor, for at least one streak in the image using the modified first calibration target data set (step S840). For example, process 800 may include compensating appropriate gains and offsets using the modified first calibration target data set. Examples of compensating the appropriate gains and offsets are discussed above with respect to, for example, FIGS. 1-7.

After the first calibration target data set is obtain (step S810), the second calibration target data set is obtained (step S820), the first calibration target data set is modified (step S830), and/or the streak has been compensated for (step S840), process 800 may end (step S855).

The disclosed examples may include systems, devices, computer-readable storage media, and methods for streak compensation. For purposes of explanation, certain examples are described with reference to the components illustrated in FIGS. 1 and 2. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Moreover, as used in the specification and the appended claims, the singular forms "a," "an," and "the" are intended to include the plural forms as well, unless the context indicates otherwise. Additionally, although the terms first, second, etc. may be used herein to describe various elements, these elements should not be limited by this terms. Instead, these terms are used to distinguish one element from another.

Further, the sequence of operations described in connection with FIGS. 1-8 are examples and are not intended to be limiting. Additional or fewer operations or combinations of operations may be used or may vary without departing from the scope of the disclosed examples. Thus, the present disclosure merely sets forth possible examples of implementations, and many variations and modifications may be made to the described examples. All such modifications and variations are intended to be included within the scope of this disclosure and protected by the following claims.

I claim:

1. A scanning system for streak compensation comprising:
a first calibration target engine to generate a first calibration target data set based on a scan of a first calibration target;

a second calibration target engine to generate a second calibration target data set based on a scan of a second calibration target, wherein generating the second calibration target data set based on the scan of the second calibration target comprises:
   performing a dark scan of the second calibration target to generate a dark second calibration target image, the dark second calibration target image including a set of dark pixel columns, each of the set of dark pixel columns including a dark column pixel value and a dark column position value;
   for each column of the set of dark pixel columns:
      calculating a dark narrow window average by averaging dark column pixel values of a first number of the set of pixel columns;
      calculating a dark wide window average by averaging dark column pixel values of a second number of adjacent columns of the set of dark pixel columns, the second number being larger than the first number;
      determining a dark difference value between the dark narrow window average and the dark wide window average; and
      if the dark difference value exceeds a dark threshold;
         calculating a dark detected streak value by obtaining the difference between the dark column pixel value of a particular column and the dark wide window average; and
         storing the dark column position value of the particular column and the dark detected streak value as a dark image entry in the second calibration target data set,
   the scan of the second calibration target being performed by a scanning device calibrated based on the first calibration target data set,
   the second calibration target data set representing streaks detected in an image of the second calibration target generated during the second calibration target scan; and
   a streak compensation engine to compensate for streaks by recalibrating the scanning device based on the first calibration target data set and the second calibration target data set.

2. The scanning system of claim 1, wherein the streak compensation engine recalibrates the scanning device based on a first portion of the first calibration target data set and a combination of the second calibration target data set and a second portion of the first calibration target data set.

3. The scanning system of claim 1, wherein the first calibration target is a white calibration strip and the second calibration target is one of a black calibration strip or a gray calibration strip.

4. The scanning system of claim 1, wherein recalibrating the scanning device using the first calibration target data set and the second calibration target data set comprises:
   determining, based on the second calibration target data set, a first dark column position value and a corresponding first dark detected streak value;
   determining, based on the first calibration target data set, a first dark pixel value corresponding to the first dark column position value; and
   adding the first dark pixel value to the first dark detected streak value to generate a dark scan profile.

5. The scanning system of claim 4, wherein recalibrating the scanning device using the first calibration target data set and the second calibration target data set comprises:
   determining, based on the second calibration target data set, a first gray column position value and a corresponding first gray detected streak value;
   determining, based on the first calibration target data set, a first gray pixel value corresponding to the first gray column position value;
   adding the first gray pixel value to the first gray detected streak value to generate a gray scan profile; and
   calculating final gains and offsets based on the dark scan profile and the gray scan profile.

6. The scanning system of claim 1, wherein generating the first calibration target data set based on the scan of the first calibration target comprises:
   performing a dark scan of the first calibration target at a first illumination level, the dark scan generating a dark first calibration target image;
   performing a gray scan of the first calibration target at a second illumination level brighter than the first illumination level, the gray scan generating a gray first calibration target image;
   performing a white scan of the first calibration target at a third illumination level brighter than the second illumination level, the white scan generating a white first calibration target image; and
   determining each pixel value and pixel location of the dark first calibration target image, the gray first calibration target image, and the white first calibration target image.

7. The scanning system of claim 6, wherein scanning a second calibration target to generate a second calibration target data set comprises:
   performing a gray scan of the second calibration target to generate a gray second calibration target image, the gray second calibration target image including a set of gray pixel columns, each of the set of gray pixel columns including a gray column pixel value and a gray column position value;
   for each column of the set of gray pixel columns:
      calculating a gray narrow window average by averaging gray column pixel values of a first number of the set of gray pixel columns;
      calculating a gray wide window average by averaging gray column pixel values of a second number of adjacent columns of the set of gray pixel columns, the second number of adjacent columns of the set of gray pixel columns being larger than the first number of the set of gray pixel columns;
      determining a gray difference value between the gray narrow window average and the gray wide window average; and
      if the gray difference exceeds a gray threshold:
         calculating a gray detected streak value by obtaining the difference between the gray column pixel value and the gray wide window average; and
         storing the gray column position value of the particular column and the gray detected streak value as a gray image entry in the second calibration target data set.

8. The scanning system of claim 7, comprising calculating the gray column pixel values by: modifying a set of gray pixel values corresponding to the particular column, the set of gray pixel values being modified to remove at least one outlier; and averaging, for each of a plurality of color channels, the modified set of gray pixel values.

9. The scanning system of claim 7, wherein:

the first illumination level, the second illumination level, and the third illumination level are generated, at least in part, by a light source having a maximum illumination level;

to generate the first illumination level, the light source does not emit any light;

to generate the second illumination level, the light source is set at one quarter of the maximum illumination level; and to generate the third illumination level, the light source is set at the maximum illumination level.

10. A non-transitory computer-readable storage medium encoded with instructions that, when executed by a processor, perform a method for streak compensation, the method comprising:

calibrating an initial gain for data from an optical element, the initial gain being calibrated based on a scan of a first calibration target;

obtaining an image of a second calibration target from the optical element using the calibrated initial gain;

detecting at least one streak in the image of the second calibration target, wherein detecting the at least one streak in the image of the second calibration target comprises:

determining a position of a first streak in the image of the second calibration target; and determining a reflection strength associated with the first streak;

recording data representing the at least one detected streak; and calibrating a final gain for the optical element based on the initial gain and the data representing the at least one detected streak, wherein calibrating the final gain comprises:

determining, based on gain data representing the initial gain, a pixel value associated with the position of the first streak;

modifying the gain data by adding the reflection strength to the pixel value; and using the modified gain data to modify image data from the optical element.

11. The computer-readable storage medium of claim 10, wherein detecting the at least one streak in the image of the second calibration target comprises detecting reflected light from particles on the optical element using the second calibration target.

12. A computer-implemented method for streak compensation comprising:

obtaining, via a processor, a first calibration target data set using a first calibration target;

obtaining, via the processor, a second calibration target data set using a second calibration target, the second calibration target data set being generated by a scanning device after the scanning device is initially calibrated based on the first calibration target data set, the second calibration target data set indicating at least one streak in an image of the second calibration target, wherein generating the second calibration target data set comprises:

performing a dark scan of the second calibration target to generate a dark second calibration target image, the dark second calibration target image including a set of dark pixel columns, each of the set of dark pixel columns including a dark column pixel value and a dark column position value;

for each column of the set of dark pixel columns:

calculating a dark narrow window average by averaging dark column pixel values of a first number of the set of pixel columns;

calculating a dark wide window average by averaging dark column pixel values of a second number of adjacent columns of the set of dark pixel columns, the second number being larger than the first number;

determining a dark difference value between the dark narrow window average and the dark wide window average; and if the dark difference value exceeds a dark threshold:

calculating a dark detected streak value by obtaining the difference between the dark column pixel value of a particular column and the dark wide window average; and storing the dark column position value of the particular column and the dark detected streak value as a dark image entry in the second calibration target data set;

modifying, via the processor, the first calibration target data set based on the second calibration target data set; and compensating, via the processor, for the at least one streak in the image using the modified first calibration target data set.

13. The computer-implemented method of claim 12, wherein modifying the first calibration target data set based on the second calibration target data set comprises adding, based on pixel location, pixel values in the second calibration target data set to pixel values in the first calibration target data set.

* * * * *

UNITED STATES PATENT AND TRADEMARK OFFICE
CERTIFICATE OF CORRECTION

PATENT NO. : 10,187,548 B2
APPLICATION NO. : 15/327155
DATED : January 22, 2019
INVENTOR(S) : Choon Hwee Yap It is certified that error appears in the above-identified patent and that said Letters Patent is hereby corrected as shown below:

In the Drawings

In sheet 8 of 8, reference numeral S820, Line 1, delete "CALIBRATIONDATA" and insert -- CALIBRATION DATA --, therefor.

In the Claims

In Column 15, Line 25, in Claim 1, delete "threshold;" and insert -- threshold: --, therefor.

Signed and Sealed this
Nineteenth Day of November, 2019

Andrei Iancu
*Director of the United States Patent and Trademark Office*